United States Patent [19]
Culot et al.

[11] Patent Number: 5,844,038
[45] Date of Patent: Dec. 1, 1998

[54] POLYSILOXANE COMPOSITIONS

[75] Inventors: Dominique Culot, Godarville; Patrick Deglasse, Le Roeulx; Sesto Di Marco, Quaregnon; Jean Iker, Overijse, all of Belgium

[73] Assignee: Dow Corning S. A., Seneffe, Belgium

[21] Appl. No.: 789,467

[22] Filed: Jan. 27, 1997

[30] Foreign Application Priority Data

Jan. 30, 1996 [GB] United Kingdom .................. 9601782
Apr. 17, 1996 [GB] United Kingdom .................. 9607950

[51] Int. Cl.$^6$ .................................. C08J 3/00; C08J 5/24; C08J 58/00; C08F 8/00
[52] U.S. Cl. ..................... 524/506; 524/267; 524/425; 524/854; 524/731; 525/103
[58] Field of Search .................................. 524/267, 425, 524/506, 854, 731; 525/103

[56] References Cited

U.S. PATENT DOCUMENTS 4,962,152  10/1990  Leempoel ................. 524/788
5,118,738   6/1992  Berthet et al. ............ 524/159
5,425,947   6/1995  Hautekeer et al. ......... 524/267

Primary Examiner—James C. Housel
Assistant Examiner—Rodney P. Swartz
Attorney, Agent, or Firm—Roger H. Borrousch; Patricia M. Scaduto

[57] ABSTRACT

The present invention discloses the use of a polymer chain having at least one carboxylic acid anhydride group as a consistency stabilizer in the base part of a two-part silicone sealant. The base part consists essentially of the consistency stabilizer, 100 parts by weight of a polymeric material having not less than two groups bonded to silicon which are hydroxyl or hydrolysable groups, 5 to 150 parts by weight of filler and, optionally, pigments and/or plasticizers.

22 Claims, No Drawings

POLYSILOXANE COMPOSITIONS

This invention is concerned with improvements in or relating to polysiloxane compositions.

Polysiloxane compositions find use in various applications, for example in sealant compositions which can be applied to a joint between elements and cured to provide an elastomeric seal between them. Those compositions which cure at room temperature upon exposure to atmospheric moisture are particularly attractive for use as sealant compositions for sealing, for example highway joints, joints in articles, for example vehicle headlights, and joints in glazing applications, particularly structural glazing, in view of the fact that no special heating or other cure conditions are generally required to produce a seal of desired quality.

Compositions intended for use as silicone sealants are required to have a combination of properties. For example, they should be capable of keeping their physical stability when stored at rest for one or two years.

Moisture curable silicone sealants which cure at room temperature are formulated to be delivered as either one part or two part compositions. In the case of a two part composition, the part of the composition comprising a curing agent is called the catalyst part and the part of the composition comprising a filler is called the base part. This invention is concerned with two part compositions and, especially, the base part in such a two part composition.

The physical stability of a silicone sealant involves stability during storage under the influence of environmental factors such as light, moisture, heat and atmospheric pressure. Physical instability leads to, for example, a discoloration effect, loss of consistency or a loss of cure performance.

When a base part is inconsistent, it will not be possible to process the product in the pumping equipment used to mix the base part with the catalyst part. The base part runs over the seals of the pumping equipment and it is not possible to mix and to deliver the curable silicone sealant. From the applicator's point of view, it signifies that the base part of the composition cannot be handled when it has aged. From the chemical point of view, if signifies that the structure of the base part has changed with time and does not provide suitable properties.

The consistency of a base part can be measured, for example, by its rheological properties. A preferred method used to measure the rheological properties in the present application is referred to as a slump test and involves measuring the downward flow of composition in a vertically disposed simulated joint.

It is one of the objects of the present invention to provide a base part having rheological stability.

The invention provides in one of its aspects the use of a polymer chain having at least one carboxylic acid anhydride group as a consistency stabilizer in a base part composition consisting essentially of 100 parts by weight of a polymeric material having not less than two groups bonded to silicon which are hydroxyl or hydrolysable groups, 5 to 150 parts by weight of filler and, optionally, pigments and/or plasticizers.

The polymeric material having not less than two groups bonded to silicon which are hydroxyl or hydrolysable groups may be according to the general formula X-A-X where A may be any desired organic or siloxane molecular chain, for example a polyoxyalkylene chain, or more preferably a polydiorganosiloxane and thus preferably includes siloxane units $R_sSiO_{4-s/2}$ in which R represents an alkyl group having from 1 to 6 carbon atoms, for example a methyl, vinyl, phenyl group, or a fluorinated alkyl group and s has a value of 0, 1 or 2. Preferred materials are linear materials i.e. s=2 for all units. Preferred materials have polydiorgano-siloxane chains according to the general formula $-(R_2SiO)_t-$ in which each R represents a methyl group and t has a value from about 200 to about 1500. Suitable materials have viscosities of the order of 500 mPa.s to 200,000 mPa.s.

The groups X of the polymeric material may be selected, for example, from $R_2SiOH$, $R_pSi(OR)_{3-p}$ or $R_2SiR'SiR_p(OR)_{3-p}$ where R is as aforesaid, R' is a divalent hydrocarbon group and p has the value 0, 1 or 2.

Compositions used in this invention contain one or more finely divided, reinforcing or extending fillers such as high surface area fumed or precipitated silicas, crushed quartz, diatomaceous earth, calcium carbonate, barium sulphate, iron oxide, titanium dioxide and carbon black. The proportion of such fillers employed will depend on the properties desired in the elastomer-forming composition and the cured elastomer.

Compositions according to the invention include a consistency stabilizer. As used herein, a consistency stabilizer is a material which causes the rheological properties of the base part to remain similar over time. As such, the consistency stabilizer renders it possible to process the product in pumping equipment used for mixing the base part treated with such a stabilizer with the catalyst part, even after the base part has been stored for significant periods of time.

The consistency stabilizer of the present invention comprises a polymer having attached to its polymer chain at least one carboxylic acid anhydride group. This polymer may have two or more anhydride groups per polymer chain and is preferably a mixture having an average of about 1 to 7 anhydride groups per polymer chain. The polymer chain is fluid or capable of being rendered effectively fluid e.g. by solution in organic solvent at the temperature at which the composition is prepared. Preferably it has a viscosity in the range 1,000 to 30,000 mm$^2$/s.

Any desired polymer chain may be used which does not adversely influence properties of the composition. Polymers having an anhydride group as a terminal, chain or pendant group may be employed. It is a desirable to ensure that the polymer employed is compatible with the other ingredients of the composition so that it does not tend to separate from the composition after it has cured.

In proportions of less than 10 parts by weight per 100 parts by weight of the hydroxypolysiloxane the polymers produced from polybutadiene or polystyrene are suitable for use in the invention as are polymers produced from polysiloxanes. Polymers made by "functionalizing" a polybutadiene with maleic acid anhydride or by copolymerisation of styrene and maleic acid anhydride are commercially available and suitable for use in the present invention. We prefer to employ a polybutadiene polymer which has been treated with a carboxylic acid anhydride and has a molecular weight in the range 1,000 to 6,000, a viscosity in the range 1500 to 20,000 mm$^2$/s, an acid number (mg KOH/g) in the range 50 to 200 and an average of between 1.2 and 5 anhydride groups per molecule.

The preferred consistency stabilizer may be employed in proportions of 0.1 to 5 parts by weight per 100 parts by weight of the filler. We prefer to employ from about 0.25 to about 1.5 parts by weight of the consistency stabilizer per 100 parts by weight of the polymeric material having not less than two hydroxyl or hydrolysable groups attached to silicon.

Other ingredients which may be included in the composition of the invention are those which are conventional to the formulation of silicone rubber sealant base parts and the like, for example, pigments and plasticizer. For instance, a polydimethyl-siloxane having terminal triorganosiloxy groups wherein the organic substituents are e.g. methyl, vinyl or phenyl or combinations of these groups can be employed as a plasticizer and to reduce the modulus of the cured elastomer is. Such polydimethylsiloxanes normally have a viscosity of from about 100 to about 100,000 mPa.s at 25° C.

The base part compositions of this invention can be prepared by mixing the ingredients in any order and employing any suitable mixing equipment. Any optional additional ingredients may likewise be incorporated at any stage of the mixing operation. After mixing, the compositions may be stored under substantially anhydrous conditions, for example in sealed containers, until required for use.

The base part of the invention is used by mixing it with a curing part prior to dispensing the mixture for its final utility in, for instance, a ratio of 10:1. The catalyst part which can be used with the base part of the present invention can be any which are known in the sealant art. For instance, the catalyst part often contains an alkoxy-silane curative of the general formula $R_{4-n}Si(OR)_n$ wherein R is as aforesaid and n has a value of 2, 3 or 4. If a more rapid cure is desired, the curative part can contain a chelate, for example an acetyl acetonate. Those acetyl acetonate materials conventionally used as accelerators for titanium catalysts may be employed, for example ethyl acetonyl acetonate and methyl acetonyl acetonate.

Similarly, the catalyst part may contain co-catalysts for increasing the rate of cure of the composition, agents (usually organosilicon compounds) for treating fillers, and adhesion improving substances for example γ-aminopropyl triethoxysilane. Suitable co-catalysts are well known in the art and include the metal salts of carboxylic acids, for example lead octoate and dibutyltin dilaurate, dibutyltin diacetate, stannous octoate and dibutyltin diversatate.

The use of a polymeric chain having at least one carboxylic acid anhydride group as consistency stabilizer according to this invention leads to a number of advantages. For example, a base part containing the consistency stabilizer retains similar rheological properties over time. By contrast, base parts not containing the consistency additive show significant changes in their rheological properties over time such that they become difficult to work with. As such, base parts of the invention can be produced with a 30% improvement in productivity as compared to compositions not including the additive but prepared under the same manufacturing conditions. Other advantages will be apparent from the following example.

In order that the invention may become more clear there now follows a description of an example illustrative of the invention compared to a reference material.

All parts and percentages are expressed by weight. All measurements were made at 25° C.

A base part of a two part composition was prepared. 100 parts of an hydroxyl end-blocked polydimethylsiloxane were mixed with 85 parts of calcium carbonate filler supplied by Solvay under the trade name Socal 312N. To the resulting mixture was added 2.6 parts of a low viscosity hydroxyl endblocked polydimethylsiloxane having a viscosity of 40 cSt at 25° C. and 0.036 parts of carbon black supplied by PFIZER Pigments under the trade name lampblack LB-1011.

This composition represents the reference material and is called hereinafter "B reference".

To portions of said B reference were then added 0.2, 0.35 and 0.5 parts per 100 parts of the hydroxyl end-blocked polysiloxane of a carboxylated polybutadiene supplied under the trade name Polyvest C-70 to form Compositions C, D and E. The base part of the 2 parts compositions according to the invention,(C, D, and E) and the B reference material were submitted to a slump test at 1 day, 1 month to 10 month on a monthly basis. Each slump data in Table 2 is a statistical mean of several measurements.

The test consisted of the following steps. A clean flow jig was placed face up on a flat surface with its plunger depressed to the limit of its travel, (0.95 cm). The cavity was filled with the test sample. The surface was levelled with two passes of a blade, starting at the centre and moving to one side of the jig. The loading operation was completed within 2 minutes and a minimum amount of working of the sample was used. The jig was immediately set in a vertical position and the plunger was advanced to the limit of its forward travel and the timer was started. The jig was allowed to stand undisturbed for 5 minutes. The sample flowed down the face of the jig. The point of furthest advance, using graduated scale, was recorded. The result was reported to the nearest mm.

The sample was allowed to equilibrate to room temperature (at least 6 hours) prior to the test.

Table 2 shows the rheological stability of the base parts of the present invention which include a carboxylated polybutadiene. This stability is demonstrated by the small changes in slump over time for the compositions of the invention as compared to the dramatic increases in slump over time demonstrated by the reference material.

TABLE I

| | Composition | | | |
|---|---|---|---|---|
| Ingredient | B Reference | C | D | E |
| Hydroxyl endblocked polydiorganopolysiloxane | 100 | 100 | 100 | 100 |
| Filler | 80.5 | 80.5 | 80.5 | 80.5 |
| Low viscosity hydroxyl endblocked polysiloxane | 2.6 | 2.6 | 2.6 | 2.6 |
| Carbon black | 0.036 | 0.036 | 0.036 | 0.036 |
| Carboxylated polybutadiene | 0 | 0.2 | 0.35 | 0.5 |

TABLE 2

| | Slump Test Results (mm) | | | |
|---|---|---|---|---|
| Time | B Reference | C | D | E |
| 1 day | 0.5 | 0.5 | 0.5 | 0.5 |
| 1 month | 1.5 | 1 | 1 | 0.5 |
| 2 | 2 | 1 | 1 | 0.5 |
| 3 | 6 | 1 | 2.5 | 1 |
| 4 | 12 | 2.5 | 2.5 | 1 |
| 5 | 15.5 | 2 | 1.5 | 0.5 |
| 6 | 20 | 1.5 | 1 | 1 |
| 8 | 42 | | | 0.5 |
| 10 | 57 | | | 0.5 |

That which is claimed is:

1. A method of stabilizing the slump characteristics, over time, of a base composition consisting essentially of mixing 100 parts by weight of a polymeric material having not less than two groups bonded to silicon which are hydroxyl or hydrolysable groups, 5 to 150 parts by weight of filler, and any amount of slump-stabilizing polymer having attached to its polymer chain at least one carboxylic acid anhydride group where said amount is sufficient to stabilize the slump characteristics over a storage time period, to obtain a base composition with a desired slump property, and storing the resulting base composition for a period of time where the slump property of the base composition remains substantially the same over said time period.

2. The method according to claim 1 in which the filler is calcium carbonate.

3. The method according to claim 2 in which the filler has a particle size from 20 to 200 nanometers.

4. The method according to claim 1 in which the slump-stabilizing polymer is a polybutadiene functionalized with maleic acid anhydride.

5. The method according to claim 2 in which the slump-stabilizing polymer is a polybutadiene functionalized with maleic acid anhydride.

6. The method according to claim 3 in which the slump-stabilizing polymer is a polybutadiene functionalized with maleic acid anhydride.

7. The method according to claim 1 in which the amount of slump-stabilizing polymer is present in an amount of from 0.1 to 5 parts by weight based on 100 parts by weight of the polymeric material.

8. The method according to claim 7 in which the amount of slump-stabilizing polymer is present in an amount of from 0.25 to 1.5 parts by weight based on 100 parts by weight of the polymeric material.

9. The method according to claim 2 in which the amount of slump-stabilizing polymer is present in an amount of from 0.1 to 5 parts by weight based on 100 parts by weight of the polymeric material.

10. The method according to claim 9 in which the amount of slump-stabilizing polymer is present in an amount of from 0.25 to 1.5 parts by weight based on 100 parts by weight of the polymeric material.

11. The method according to claim 3 in which the amount of slump-stabilizing polymer is present in an amount of from 0.1 to 5 parts by weight based on 100 parts by weight of the polymeric material.

12. The method according to claim 11 in which the amount of slump-stabilizing polymer is present in an amount of from 0.25 to 1.5 parts by weight based on 100 parts by weight of the polymeric material.

13. The method according to claim 4 in which the amount of slump-stabilizing polymer is present in an amount of from 0.1 to 5 parts by weight based on 100 parts by weight of the polymeric material.

14. The method according to claim 13 in which the amount of slump-stabilizing polymer is present in an amount of from 0.25 to 1.5 parts by weight based on 100 parts by weight of the polymeric material.

15. The method according to claim 4 in which the amount of slump-stabilizing polymer is present in an amount of from 0.1 to 5 parts by weight based on 100 parts by weight of the polymeric material.

16. The method according to claim 15 in which the amount of slump-stabilizing polymer is present in an amount of from 0.25 to 1.5 parts by weight based on 100 parts by weight of the polymeric material.

17. The method according to claim 6 in which the amount of slump-stabilizing polymer is present in an amount of from 0.1 to 5 parts by weight based on 100 parts by weight of the polymeric material.

18. The method according to claim 17 in which the amount of slump-stabilizing polymer is present in an amount of from 0.25 to 1.5 parts by weight based on 100 parts by weight of the polymeric material.

19. A base composition obtained from the method of claim 1.

20. A base composition obtained from the method of claim 2.

21. A base composition obtained from the method of claim 4.

22. A base composition obtained from the method of claim 18.

* * * * *